US012416196B2

(12) United States Patent
Nill

(10) Patent No.: US 12,416,196 B2
(45) Date of Patent: Sep. 16, 2025

(54) ACCESSORY STRUCTURE MOUNTING SYSTEM

(71) Applicant: LN1 INC., Southampton, NY (US)

(72) Inventor: Lance Nill, Southampton, NY (US)

( * ) Notice: Subject to any disclaimer, the term of this patent is extended or adjusted under 35 U.S.C. 154(b) by 305 days.

(21) Appl. No.: 18/003,511

(22) PCT Filed: Aug. 11, 2021

(86) PCT No.: PCT/US2021/045604
§ 371 (c)(1),
(2) Date: Dec. 28, 2022

(87) PCT Pub. No.: WO2022/035999
PCT Pub. Date: Feb. 17, 2022

(65) Prior Publication Data

US 2023/0243205 A1 Aug. 3, 2023

Related U.S. Application Data

(60) Provisional application No. 62/706,364, filed on Aug. 12, 2020.

(51) Int. Cl.
*E06B 3/54* (2006.01)
*E04F 11/18* (2006.01)

(52) U.S. Cl.
CPC ........ *E06B 3/5454* (2013.01); *E04F 11/1812* (2013.01); *E04F 11/1853* (2013.01)

(58) Field of Classification Search
CPC ........................... E06B 3/5454; E04F 11/1812
See application file for complete search history.

(56) References Cited

U.S. PATENT DOCUMENTS 3,406,946 A * 10/1968 Saultz ................. E04H 17/1413 256/65.14
3,713,259 A * 1/1973 Tkach ................. E04B 1/34342 248/354.3
4,054,268 A * 10/1977 Sher .................... E04F 11/1812 256/67
4,067,548 A * 1/1978 Murphy .............. E04F 11/1851 256/65.14

(Continued)

FOREIGN PATENT DOCUMENTS

EP 2599932 A1 6/2013
WO 2020033964 A1 2/2020

*Primary Examiner* — Joshua K Ihezie
(74) *Attorney, Agent, or Firm* — LAW OFFICES OF MICHAEL L. WISE, LLC

(57) ABSTRACT

A system for mounting an accessory structure to another structure includes: an anchor baseplate assembly, an object-mounting assembly, and an object-mounting fastener. The anchor baseplate assembly includes a baseplate and holes passing through the baseplate. The object-mounting assembly includes an opening passing through the object-mounting assembly, as well as a smooth-walled port passing through the object-mounting assembly. The object-mounting fastener is positioned in the opening of the object-mounting assembly and is fixated to the anchor baseplate assembly. The object-mounting assembly is attached to the anchor baseplate assembly by the object-mounting fastener. The smooth-walled port in the object-mounting assembly is in registry with one of the holes in the anchor baseplate assembly.

19 Claims, 8 Drawing Sheets

(56) References Cited

U.S. PATENT DOCUMENTS

| | | | | | |
|---|---|---|---|---|---|
| 4,240,766 | A * | 12/1980 | Smith | E01F 9/594 | 40/607.05 |
| 4,390,165 | A * | 6/1983 | Murdock | E04F 11/181 | 256/65.02 |
| 5,240,543 | A * | 8/1993 | Fetterhoff | F16B 5/01 | 428/116 |
| 5,666,774 | A * | 9/1997 | Commins | E04H 12/2253 | 248/188.4 |
| 6,367,224 | B1 * | 4/2002 | Leek | F16B 9/054 | 403/187 |
| 7,677,522 | B2 * | 3/2010 | Bakos | E04H 12/2261 | 248/500 |
| 7,866,636 | B1 * | 1/2011 | Hansen | E04F 11/1851 | 256/65.14 |
| 8,776,477 | B2 * | 7/2014 | Sprague | E04F 11/1851 | 52/126.5 |
| 9,453,357 | B1 * | 9/2016 | Bertato | E04C 2/46 | |
| 9,534,418 | B2 * | 1/2017 | Wallulis | E04H 17/1447 | |
| 2007/0074485 | A1 * | 4/2007 | Fiehler | E04B 2/26 | 52/782.1 |
| 2013/0145704 | A1 * | 6/2013 | Stein, Jr. | E06B 1/02 | 52/745.15 |
| 2013/0291479 | A1 * | 11/2013 | Schaefer | F24S 25/70 | 52/745.21 |

* cited by examiner

Fig. 8
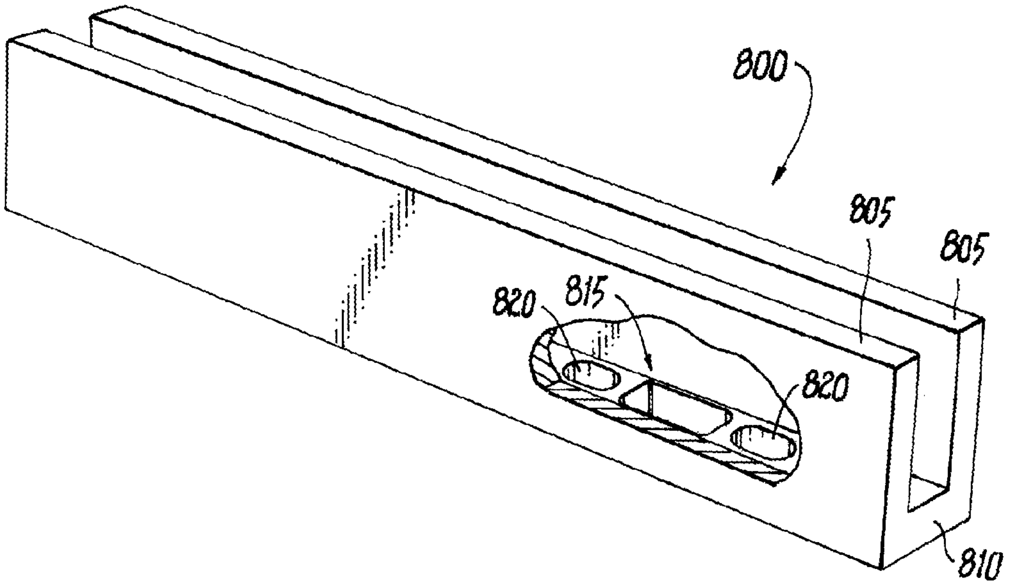
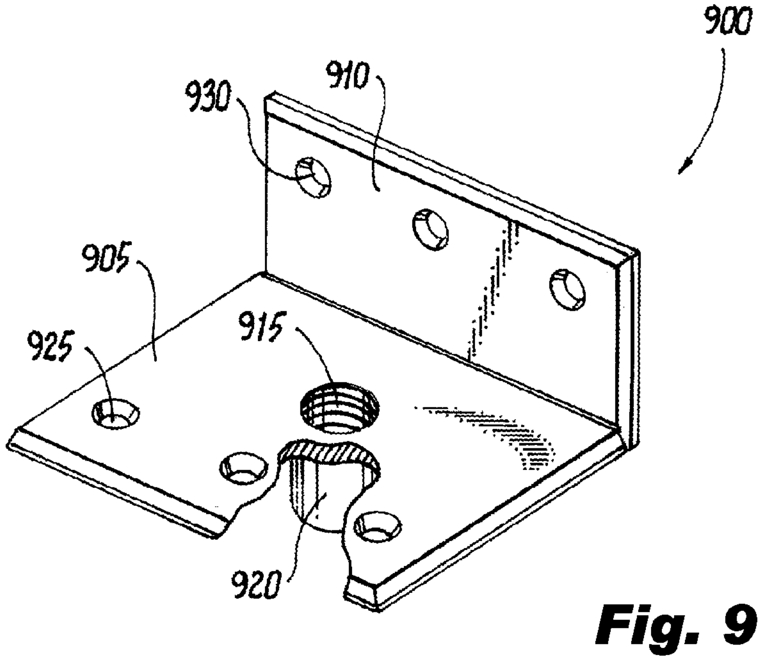
Fig. 9

ACCESSORY STRUCTURE MOUNTING SYSTEM

FIELD OF THE INVENTION

The present invention relates generally to apparatus for mounting structures to other structures, and, more particularly, to apparatus for mounting accessory structures to underlying structures such as buildings.

BACKGROUND OF THE INVENTION

Glass railings are commonly found in modern buildings. Glass railings provide aesthetic appeal, design versatility, a solid barrier, and durability.

In some installations, the glass railing is attached to a mounting shoe that runs along the bottom of the railing. The mounting shoe defines a u-shaped channel into which the glass rail is seated using a support clip or sealant. The top of the glass itself can act as a handrail, or a railing cap can be added to the top of the glass to serve this purpose.

Nevertheless, the precise installation of a glass railing system can be difficult and may require the help of an expert. At the same time, some mounting systems may create holes in the underlying structure that can lead to issues with water penetration. For these reasons, there is a need for accessory structure mounting systems that are both easy to use and avoid issues with water.

SUMMARY OF THE INVENTION

Embodiments of the present invention address the above-identified needs by providing accessory structure mounting systems that are able to be mounted to structures with ease and precision while also providing advantages with respect to water penetration.

Aspects of the invention are directed to an apparatus comprising: an anchor baseplate assembly, an object-mounting assembly, and an object-mounting fastener. The anchor baseplate assembly comprises a baseplate and a plurality of holes passing through the baseplate. The object-mounting assembly comprises an opening passing through the object-mounting assembly, as well as a smooth-walled port passing through the object-mounting assembly. The object-mounting fastener is at least partially disposed in the opening and is fixated to the anchor baseplate assembly. The object-mounting assembly is attached to the anchor baseplate assembly at least in part by the object-mounting fastener. The smooth-walled port is in registry with one of the plurality of holes.

Aspects of the invention are also directed to a method for attaching an accessory structure to a main structure. An anchor baseplate assembly is received with a baseplate and a plurality of holes passing through the baseplate. An object-mounting assembly is received with an opening passing through the object-mounting assembly, as well as a smooth-walled port passing through the object-mounting assembly. An object-mounting fastener and a plurality of anchor-baseplate fasteners are also received. The object-mounting assembly is attached to the anchor baseplate assembly at least in part by utilizing the object-mounting fastener with the object-mounting fastener at least partially disposed in the opening and fixated to the anchor baseplate assembly. With the object-mounting assembly already attached to the anchor baseplate assembly at least in part by the object-mounting fastener, each of the anchor-baseplate fasteners is passed through a respective one of the plurality of holes into the main structure to secure the anchor baseplate assembly to the main structure. One of the plurality of anchor-baseplate fasteners is also passed through the smooth-walled port.

BRIEF DESCRIPTION OF THE DRAWINGS

These and other features, aspects, and advantages of the present invention will become better understood with regard to the following description, appended claims, and accompanying drawings where:

FIG. 8 shows a partially-broken, perspective view of an object-mounting assembly in accordance with another illustrative embodiment of the invention;

FIG. 9 shows a partially-broken, perspective view of an anchor baseplate assembly in accordance with another illustrative embodiment of the invention;

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein and in the appended claims, an "angle" means an angle other than zero degrees. A first element is "integral to" a second element if the second element cannot be separated from the first element without cutting, breaking, melting, or otherwise damaging one or both elements.

Embodiments of the invention are directed to apparatus for mounting structures to other structures, and, more particularly, to apparatus for mounting accessory structures to underlying structures such as buildings.

Figure 1:
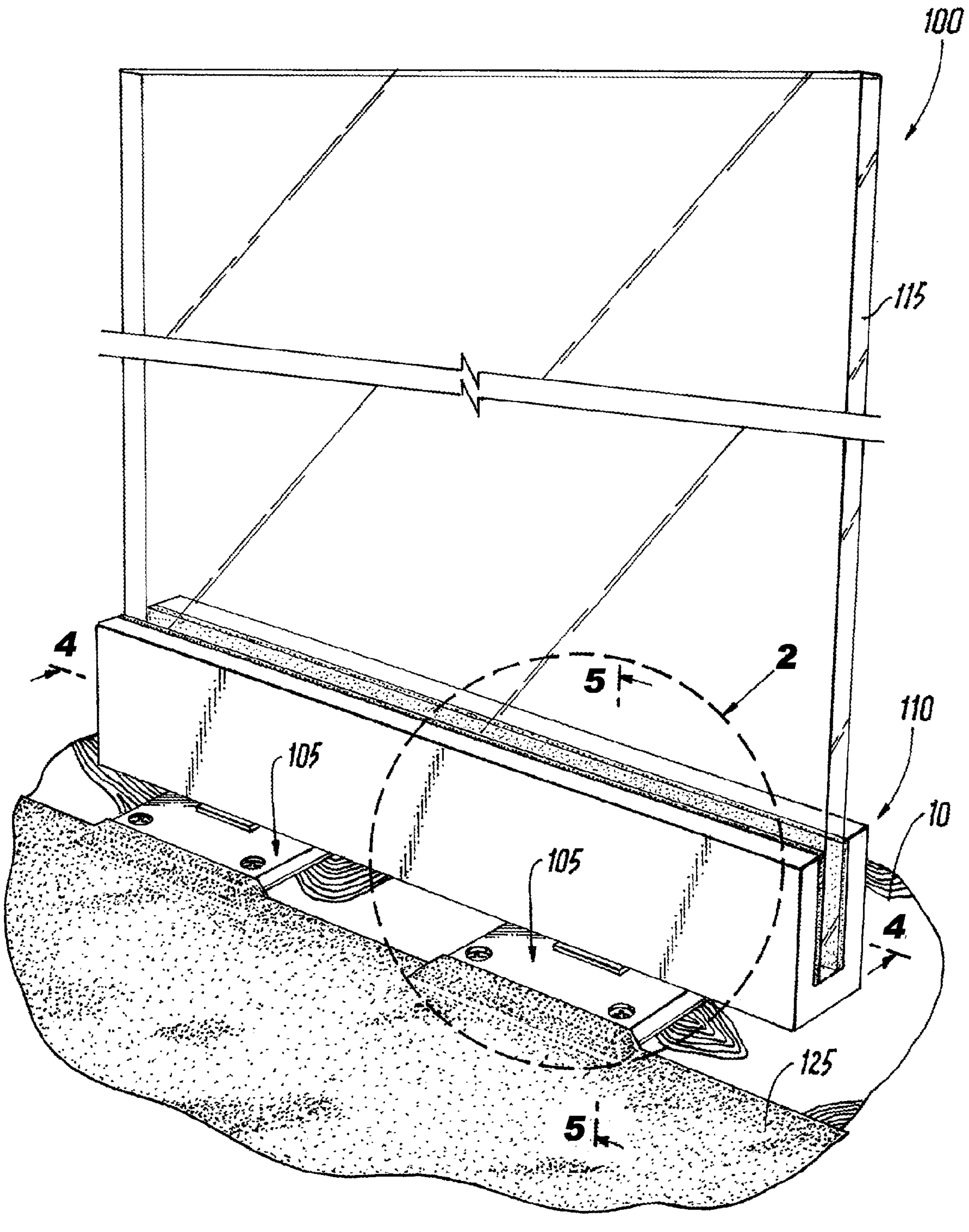
FIG. 1 shows a perspective view of an accessory structure mounting system in accordance with an illustrative embodiment of the invention.

An illustrative accessory structure is a glass railing. FIG. 1 shows a perspective view of an accessory structure mounting system 100 in accordance with an illustrative embodiment of the invention. The accessory structure mounting system 100 comprises several primary elements: a pair of anchor baseplate assemblies 105; an object-mounting assembly 110; and a pane of glass 115. The anchor baseplate assemblies 105 are fixated to a structure 10, which may be a portion of a building. The object-mounting assembly 110 is fixated to the anchor baseplate assemblies 105. Finally, the pane of glass 115 is supported by the object-mounting assembly 110, which is in the form of a window shoe. A roof membrane 125 coats the structure 10 and the anchor baseplate assemblies 105. The roof membrane 125, which may be formed of rubber, is partially pulled away in FIG. 1 to better reveal the underlying elements.

Figure 2:
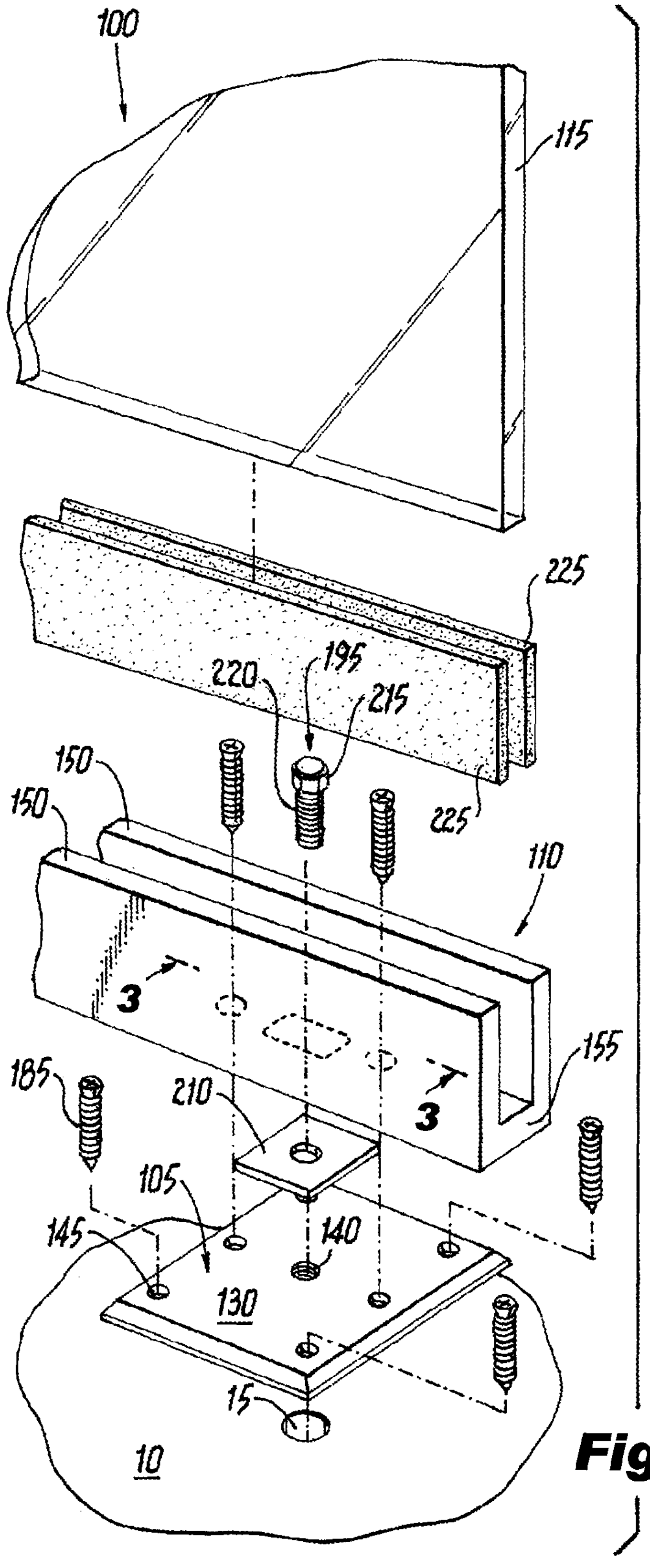
FIG. 2 shows an exploded perspective view of a portion of the FIG. 1 accessory structure mounting system.
Figure 3:
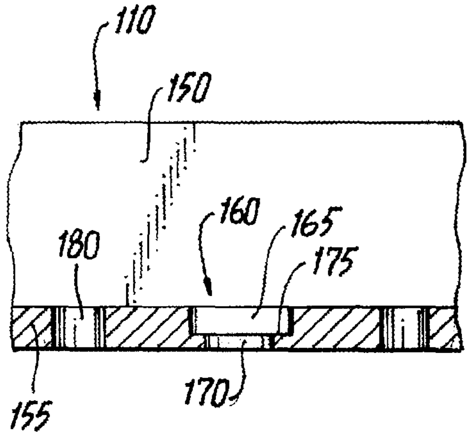
FIG. 3 shows a sectional view of a portion of the object-mounting assembly of the FIG. 1 accessory structure mounting system.
Figure 4:
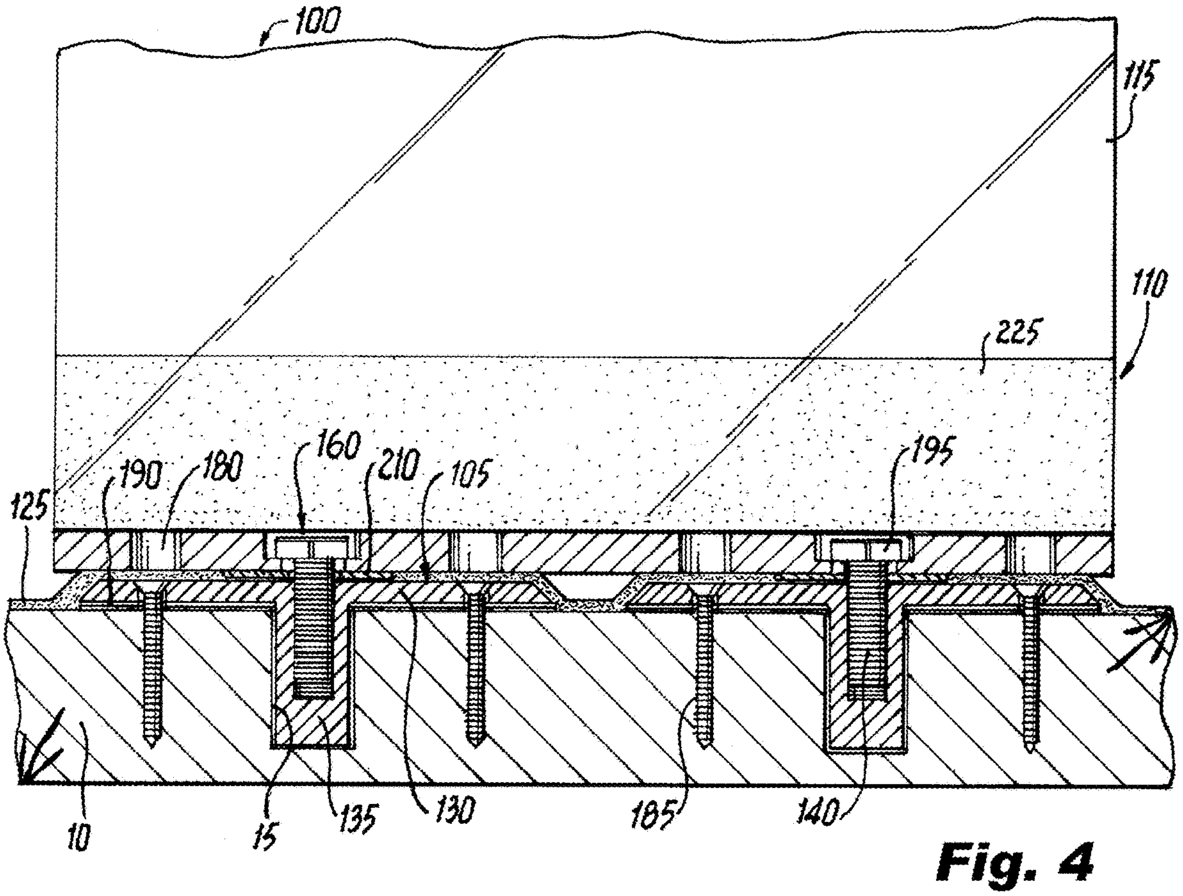
FIGS. 4 and 5 show additional sectional views of the FIG. 1 accessory structure mounting system.
Figure 5:
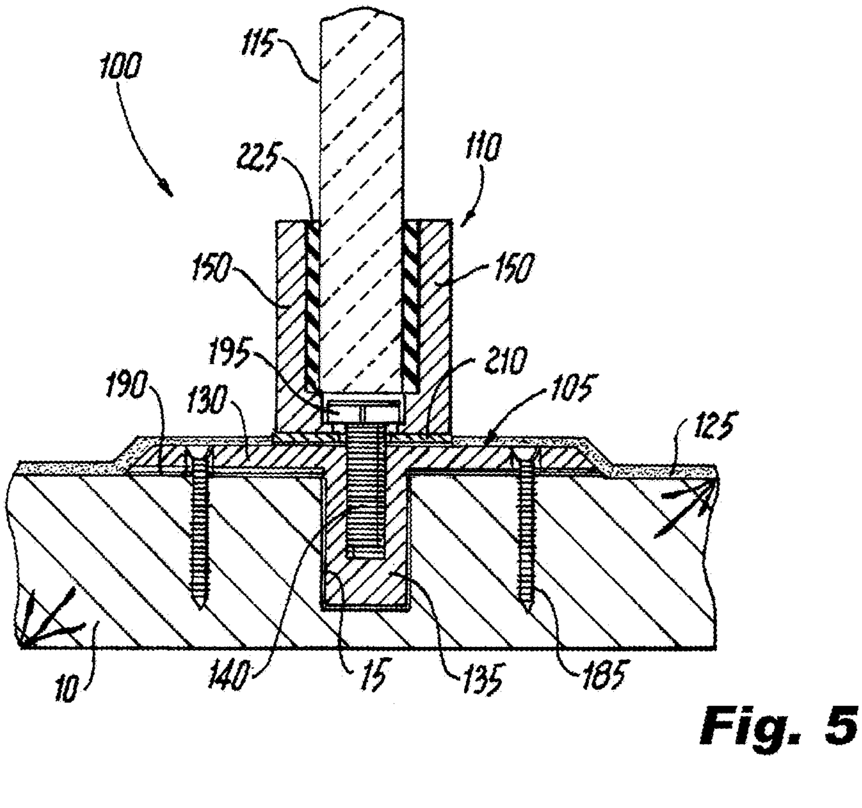

Additional features of the accessory structure mounting system 100 are set forth in FIGS. 2-5. FIG. 2 shows an exploded, perspective view of a portion of the accessory structure mounting system 100, while FIG. 3 shows a sectional view of a portion of the object-mounting assembly 110 along the cleave plane indicated in FIG. 2. FIGS. 4 and 5 show additional sectional views of the accessory structure mounting system 100 along the cleave planes indicated in FIG. 1.

The anchor baseplate assemblies 105 are largely identical and are therefore labeled with like reference numerals. Each anchor baseplate assembly 105 includes a baseplate 130 from which projects a post 135. An internally-threaded bore 140 is in the post 135. The internally-threaded bore 140 is closed at one end (i.e., it is blind). Six holes 145 also pass through the baseplate 130 and are positioned generally adjacent to the periphery of the baseplate 130.

The object-mounting assembly 110 comprises a pair of parallel sidewalls 150 and a floor 155 that spans between bottom edges of the parallel sidewalls 150. The object-mounting assembly 110 is therefore u-shaped when considered in profile. In the present embodiment, the floor 155 defines a pair of openings 160, which pass through the floor 155. Considered in profile, each of the openings 160 comprises an upper open portion 165, which is characterized by an upper length and an upper width, that merges with a lower open portion 170, which is characterized by a lower length and a lower width. The upper length is larger than the lower length, and the upper width is larger than the lower width so that the openings 160 neck down as one moves downward through the floor 155, creating shelves 175 recessed within the floor 155.

Four smooth-walled ports 180 also pass through the floor 155 of the object-mounting assembly 110. The smooth-walled ports 180 are arranged on the lengthwise axes of the openings 160. A pair of the smooth-walled ports 180 are disposed on either side of the rightmost opening 160, while another pair is disposed on either side of the leftmost opening 160. Notably, the rightmost pair of smooth-walled ports 180 fall into registry with two of the six holes 145 in the rightmost anchor baseplate assembly 105 when the rightmost opening 160 is centered on the internally-threaded bore 140 of the rightmost anchor baseplate assembly 105. At the same time, the leftmost pair of smooth-walled ports 180 fall into registry with two of the six holes 145 in the leftmost anchor baseplate assembly 105 when the leftmost opening 160 is centered on the internally-threaded bore 140 of the leftmost anchor baseplate assembly 105. Thus, the smooth-walled ports 180 allow access to the holes 145 in the anchor baseplate assemblies 105 immediately below the object-mounting assembly 110. These holes 145 would otherwise be covered by the object-mounting assembly 110.

The anchor baseplate assemblies 105 are mounted to the structure 10 using anchor-baseplate fasteners 185 that pass through the holes 145 into the structure 10. The anchor-baseplate fasteners 185 are tapered fasteners in the manner of screws. Configured in this manner, the posts 135 occupy hollowed-out volumes 15 within the structure 10. To aid with waterproofing, caulk 190 is placed between the baseplates 130 and the structure 10. The roof membrane 125 covers the structure 10 as well as the tops of both of the baseplates 130.

The object-mounting assembly 110 is mounted to the anchor baseplate assemblies 105 using object-mounting fasteners 195. The object-mounting fasteners 195 pass through the openings 160 and washers 210, and then engage the internally-threaded bores 140 of the anchor baseplate assemblies 105. In the present illustrative embodiment, the washers 210 are square. The object-mounting fasteners 195 are non-tapered fasteners in the manner of bolts. They each describe a hexagonal head 215 with an externally-threaded shaft 220 projecting therefrom. The hexagonal heads 215 have a width smaller than the widths of the upper open portions 165 of the openings 160, but larger than the widths of the lower open portions 170. At the same time, the diameters of the externally-threaded shafts 220 are smaller than the widths of the lower open portions 170, allowing the externally-threaded shafts 220 to pass through the openings 160 into the internally-threaded bores 140. Dimensioned in this manner and with the object-mounting fasteners 195 tightened via threaded engagement with the internally-threaded bores 140 of the anchor baseplate assemblies 105, the hexagonal heads 215 are disposed within the upper open portions 165 of the openings 160 while pressing down on the shelves 175. The object-mounting fasteners 195 are recessed below the upper surface of the floor 155 of the object-mounting assembly 110 while acting to attach the object-mounting assembly 110 to the anchor baseplate assemblies 105.

The pane of glass 115 occupies the u-shaped channel of the object-mounting assembly 110 between the pair of parallel sidewalls 150. A sealant 225 holds the pane of glass 115 securely in place. Alternatively, one or more support clips may be used in addition to or in place of the sealant 225.

Aspects of the invention are thereby directed to an apparatus comprising: an anchor baseplate assembly (e.g., the anchor baseplate assemblies 105); an object-mounting assembly (e.g., the object-mounting assembly 110); and an object-mounting fastener (e.g., the object-mounting fasteners 195). The anchor baseplate assembly comprises a baseplate (e.g., the baseplates 130) and a plurality of holes (e.g., the holes 145) passing through the baseplate. The object-mounting assembly comprises an opening (e.g., the openings 160) passing through the object-mounting assembly, as well a smooth-walled port (e.g., the smooth-walled ports 180) passing through the object-mounting assembly. The object-mounting fastener is at least partially disposed in the opening and is fixated to the anchor baseplate assembly. The object-mounting assembly is attached to the anchor baseplate assembly at least in part by the object-mounting fastener. The smooth-walled port is in registry with one of the plurality of holes.

Once understood from the description provided herein, the various above-described elements may be acquired commercially or manufactured using manufacturing techniques that will be familiar to one having ordinary skill in the relevant manufacturing arts. The various fasteners, washers, sealants, roof membranes, panes of glass, and the like may, for example, be obtained commercially. The anchor baseplate assemblies 105 and the object-mounting assembly 110 may be formed of metal (e.g., steel) and may be formed by conventional metal-forming techniques.

The arrangement shown in FIGS. 1-5 may be formed in at least two different ways. In describing these two methods, it is assumed that the person performing the attachment is initially presented with the structure 10 with its top surface already covered in a portion of the roof membrane 125. In a FIRST ATTACHMENT METHOD, the following sequence may be utilized:

1. Drill the hollowed-out volumes 15 in the structure 10 to accommodate the posts 135 of the anchor baseplate assemblies 105;
2. Caulk the anchor baseplate assemblies 105 and attach them to the structure 10 using the anchor-baseplate fasteners 185;
3. Cover the anchor baseplate assemblies 105 with additional roof membrane 125;
4. Mount the object-mounting assembly 110 to the anchor baseplate assemblies 105 using the object-mounting fasteners 195 and the washers 210; and
5. Mount the pane of glass 115 on the object-mounting assembly 110 using the sealant 225.

Alternatively, in a SECOND ATTACHMENT METHOD:

1. Drill the hollowed-out volumes 15 in the structure 10 to accommodate the posts 135 of the anchor baseplate assemblies 105;
2. Temporarily attach the object-mounting assembly 110 to the anchor baseplate assemblies 105 using the object-mounting fasteners 195 and the washers 210;
3. Caulk the anchor baseplate assemblies 105 and place the combination of the object-mounting assembly 110 and the anchor baseplate assemblies 105 on the structure 10 where desired;
4. Mount the anchor baseplate assemblies 105 to the structure 10 using the anchor-baseplate fasteners 185 (with four of the twelve anchor-baseplate fasteners 185 being placed through the smooth-walled ports 180 of the object-mounting assembly
5. Unmount the object-mounting assembly 110 from the anchor baseplate assemblies 105 and cover the anchor baseplate assemblies 105 with additional roof membrane 125;
6. Permanently mount the object-mounting assembly 110 to the anchor baseplate assemblies 105 using the object-mounting fasteners 195 and the washers 210; and
7. Mount the pane of glass 115 on the object-mounting assembly using the sealant 225.

Aspects of the invention are thereby also directed to a method for attaching an accessory structure to a main structure. An anchor baseplate assembly (e.g., the anchor baseplate assemblies 105) is received with a baseplate (e.g., the baseplates 130) and a plurality of holes (e.g., the holes 145) passing through the baseplate. An object-mounting assembly is received with an opening (e.g., the openings 160) passing through the object-mounting assembly, as well as a smooth-walled port (e.g., the smooth-walled ports 180) passing through the object-mounting assembly. An object-mounting fastener (e.g., the object-mounting fasteners 195) and a plurality of anchor-baseplate fasteners (e.g., the anchor-baseplate fasteners 185) are also received. The object-mounting assembly is attached to the anchor baseplate assembly at least in part by utilizing the object-mounting fastener with the object-mounting fastener at least partially disposed in the opening and fixated to the anchor baseplate assembly. With the object-mounting assembly already attached to the anchor baseplate assembly at least in part by the object-mounting fastener, each of the anchor-baseplate fasteners is passed through a respective one of the plurality of holes into the main structure to secure the anchor baseplate assembly to the main structure. One of the plurality of anchor-baseplate fasteners is also passed through the smooth-walled port.

The SECOND ATTACHMENT METHOD benefits from the ability to fully attach the anchor baseplate assemblies 105 to the structure 10 with the object-mounting assembly 110 attached to the anchor baseplate assemblies 105, allowing for more precise placement of these elements. At the same time, both the FIRST ATTACHMENT METHOD and the SECOND ATTACHMENT METHOD benefit from having the openings 160 in the object-mounting assembly 110. The openings 160 allow the object-mounting assembly 110 to be shifted longitudinally somewhat with relation to the already-mounted anchor baseplate assemblies 105, while still being firmly attached thereto using the object-mounting fasteners 195 once the proper positioning is achieved. If the openings 160 were, instead, circular, such longitudinal translation would not be available.

Independent of the attachment method, when performing the first step, the hollowed-out volumes 15 for the posts 135 may be slightly oversized to allow for some adjustability in the positioning of the anchor baseplate assemblies 105.

Advantageously, the accessory structure mounting system 100, and, more generally, apparatus in accordance with aspects of the invention, allow accessory structures such as glass railings to be mounted to buildings and the like with both ease and precision. As indicated above, the SECOND ATTACHMENT METHOD, for example, allows a combination of the anchor baseplate assemblies 105 and the object-mounting assembly 110 to be attached to a structure with great precision. Once attached, the openings 160 allow the object-mounting assembly 110 to be shifted somewhat to refine its placement even further.

The accessory structure mounting system 100 also benefits from a strong resistance to water penetration when implemented in the manner set forth in FIGS. 1-5. Water is prevented from getting under the anchor baseplate assemblies 105 from their edges because of the caulk 190 and the roof membrane 125. At the same time, water cannot penetrate from under the pane of glass 115 into the structure 10. Even if water were to reach one of the object-mounting fasteners 195, it could not go anywhere significantly further because the internally-threaded bores 140 of the anchor baseplate assemblies 105 are blind and there is no outlet for the water into the structure 10.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

For example, while two anchor baseplate assemblies 105 are used to mount the object-mounting assembly 110 to the structure 10 in the particular non-limiting, illustrative embodiment shown in FIGS. 1-5, it will be appreciated that, depending on the length of the particular object-mounting assembly, fewer or greater numbers of anchor baseplate assemblies may be utilized. In some applications, for example, an object-mounting assembly may be fixated to only a single anchor baseplate assembly. In other applications, a longer object-mounting assembly may be fixated to three or more anchor baseplate assemblies.

Figure 6:
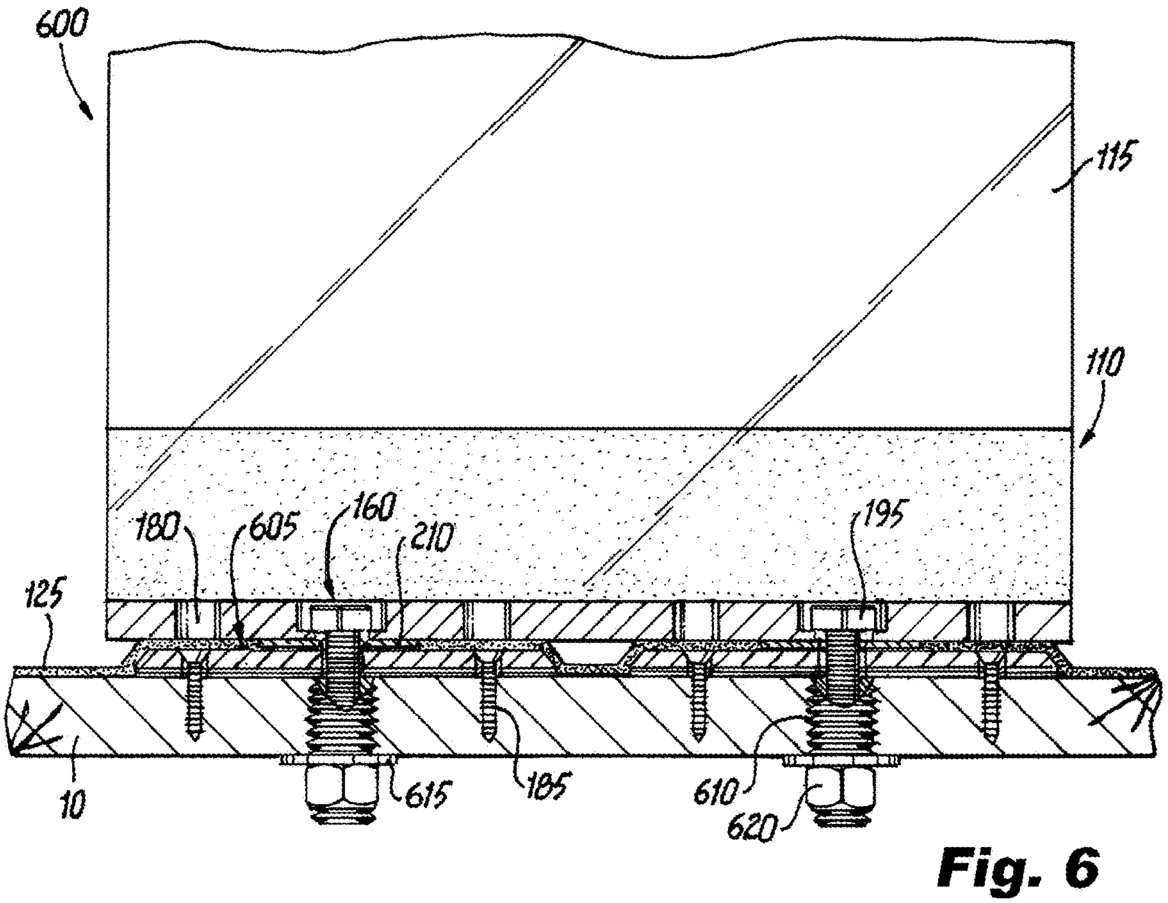
FIG. 6 shows a sectional view of an accessory structure mounting system in accordance with another illustrative embodiment of the invention.

The object-mounting assembly 110 may be utilized with anchor baseplate assemblies different from the anchor baseplate assemblies 105 shown in FIGS. 1-5. FIG. 6 shows a sectional view of an accessory structure mounting system 600 in accordance with an alternative illustrative embodiment of the invention. The accessory structure mounting system 600 combines the object-mounting assembly 110 with first alternative anchor baseplate assemblies 605. In the first alternative anchor baseplate assemblies 605, the externally-smooth posts 135 of the anchor baseplate assemblies 105 are replaced by externally-threaded posts 610 that pass all the way through the structure 10. This allows the fixation of the first alternative anchor baseplate assemblies 605 to the structure 10 to be enhanced by the addition of washers 615 and nuts 620 that occupy a side of the structure 10 opposite from the first alternative anchor baseplate assemblies 605. The nuts 620 threadably engage the externally-threaded posts 610.

Figure 7:
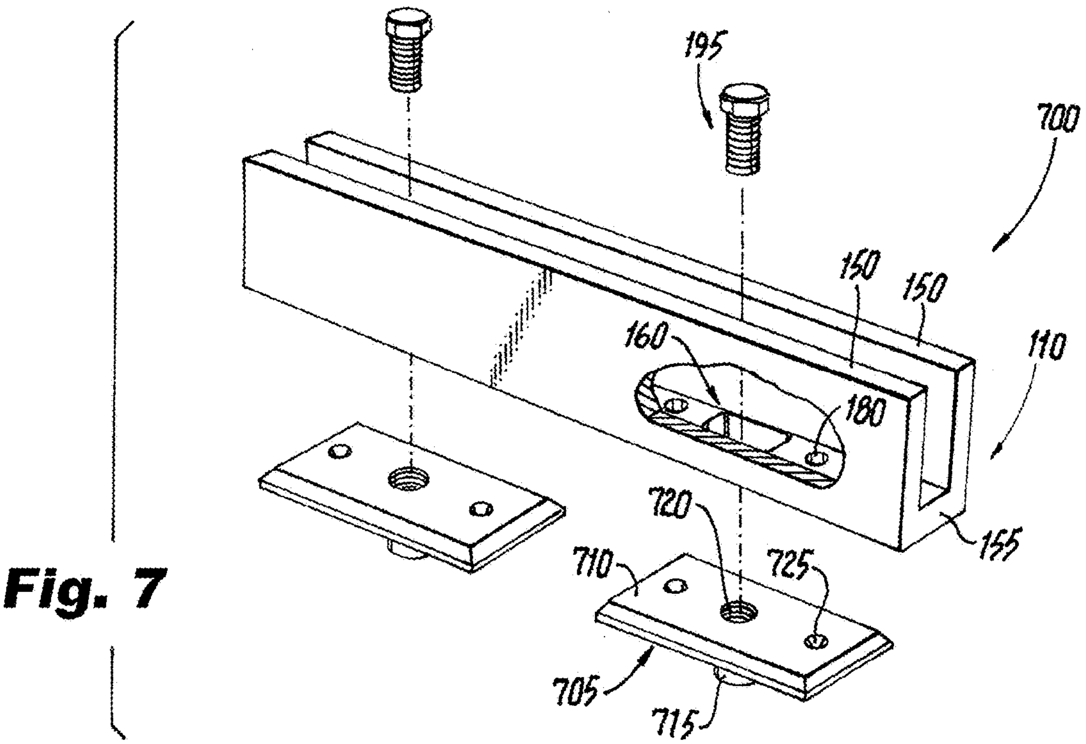
FIG. 7 shows an exploded, partially-broken, perspective view of a portion of an accessory structure mounting system in accordance with another illustrative embodiment of the invention.

Moreover, in even other alternative embodiments, the anchor baseplate assemblies may be substantially narrower than the anchor baseplate assemblies 105. FIG. 7 shows an exploded, partially-broken, perspective view of a portion of an accessory structure mounting system 700 that combines the object-mounting assembly 110 with second alternative anchor baseplate assemblies 705 having a width similar to that of the object-mounting assembly 110. Each of the second alternative anchor baseplate assemblies 705 has a baseplate 710, a post 715, an internally-threaded bore 720, and two holes 725. Both the FIRST ATTACHMENT METHOD and the SECOND ATTACHMENT METHOD may be utilized when fixating these elements to a structure 10. While multiple second alternative anchor baseplate assemblies 705 are shown in FIG. 7, they can be replaced by a single anchor baseplate assembly running about the entire length of the object-mounting assembly 110 in other embodiments, if so desired.

In addition, different forms of the object-mounting assembly may be utilized in accordance with aspects of the invention. FIG. 8 shows a partially-broken, perspective view of a first alternative object-mounting assembly 800. The first alternative object-mounting assembly 800 includes parallel sidewalls 805, a floor 810, openings 815, and smooth-walled ports 820. Here, the smooth-walled ports 820 are elongate rather than being round in the manner of the smooth-walled ports 180, providing even greater adjustability when mounting the first alternative object-mounting assembly 800 to the anchor baseplates assemblies 105. Both the FIRST ATTACHMENT METHOD and the SECOND ATTACHMENT METHOD may be utilized when fixating these elements to the structure 10.

Thus, the object-mounting assembly 110 has elongate openings 160 and round smooth-walled ports 180, while the first alternative object-mounting assembly 800 has elongate openings 815 and elongate smooth-walled ports 820. Other object-mounting assemblies in accordance with aspects of the invention may have round openings and elongate smooth-walled ports.

FIG. 9 shows a partially-broken, perspective view of a third alternative anchor baseplate assembly 900 in accordance with even another illustrative embodiment of the invention. The third alternative anchor baseplate assembly 900 is beneficial when mounting an accessary structure in the corner of a structure or where two portions of a structure come together at an angle. The third alternative anchor baseplate assembly 900 includes a primary baseplate portion 905 attached to a secondary baseplate portion 910 at an angle. In the third alternative anchor baseplate assembly 900, the angle is about ninety degrees, but that is just by way of example and may differ for different applications. An internally-threaded bore 915 passes through the primary baseplate portion 905 into a post 920 projecting from the primary baseplate portion 905. Three primary-baseplate-portion holes 925 pass through the primary baseplate portion 905, and three secondary-baseplate-portion holes 930 pass through the secondary baseplate portion 910.

Two different alternative object-mounting assemblies are presented in FIGS. 10A-11B in combination with the third alternative anchor baseplate assembly 900. Both of these modified object-mounting assemblies can support a pane of glass in the manner of the object-mounting assembly 110.

Figure 10A:
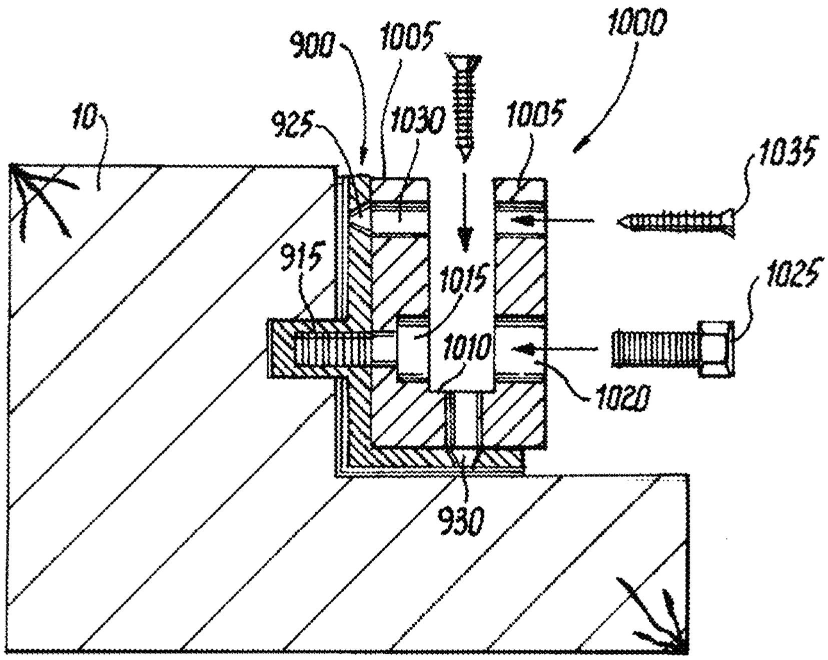
FIGS. 10A and 10B show exploded and unexploded sectional views, respectively, of an object-mounting assembly in combination with the FIG. 9 anchor baseplate assembly, in accordance with another illustrative embodiment of the invention.
Figure 10B:
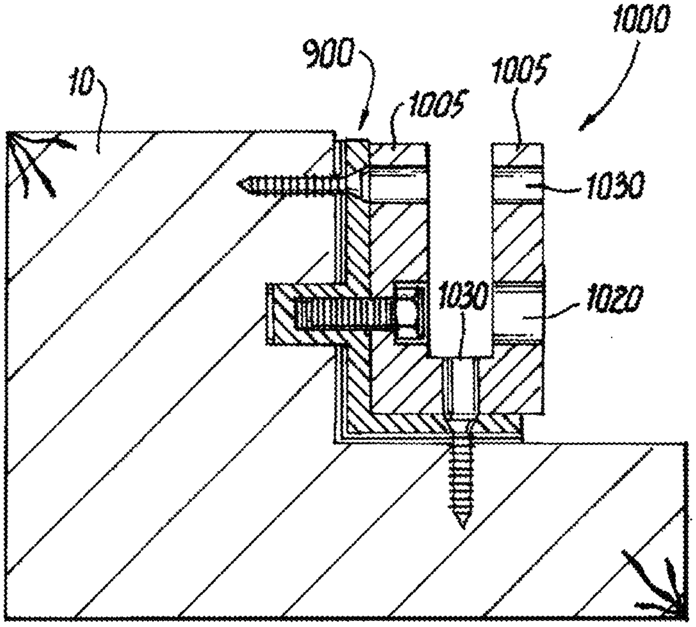

FIGS. 10A and 10B show exploded and unexploded sectional views, respectively, of a second alternative object-mounting assembly 1000 in combination with the third alternative anchor baseplate assembly 900. For clarity, no roof membranes, caulking, and washers are explicitly shown in FIGS. 10A and 10B, but they may be used when reducing aspects of the invention to practice if so desired. Like the object-mounting assembly 110, the second alternative object-mounting assembly 1000 includes two parallel sidewalls 1005 and a floor 1010. An opening 1015 (similar to the openings 160) is defined in the parallel sidewall 1005 closest to the internally-threaded bore 915, while a smooth-walled opening 1020 is defined in the opposite parallel sidewall 1005. Both openings 1015, 1020 line up with the internally-threaded bore 915 of the third alternative anchor baseplate assembly 900, allowing an object-mounting fastener 1025 to attach the second alternative object-mounting assembly 1000 to the third alternative anchor baseplate assembly 900. Smooth-walled ports 1030 in the two parallel sidewalls 1005, as well as in the floor 1010, are meanwhile in registry with the holes 925, 930 in the third alternative anchor baseplate assembly 900 so that none of the holes 925, 930 are hidden or made inaccessible by the presence of the second alternative object-mounting assembly 1000. That is, anchor-baseplate fasteners 1035 can be driven through the second alternative object-mounting assembly 1000 and the third alternative anchor baseplate assembly 900 straight into the structure 10 using, for example, a driving tool such as a screwdriver. So arranged, the assembly in FIGS. 10A and 10B may be formed by methods similar to either the FIRST ATTACHMENT METHOD or the SECOND ATTACHMENT METHOD.

Figure 11A:
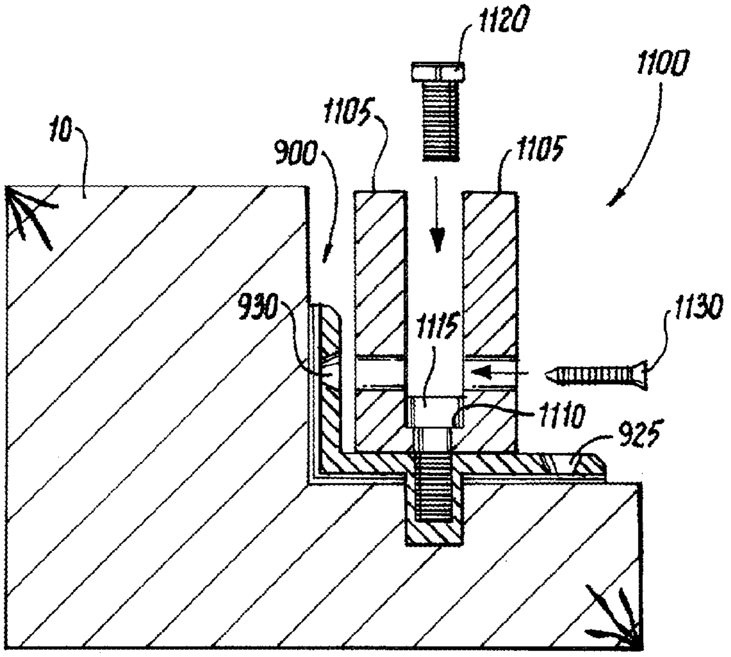
FIGS. 11A and 11B show exploded and unexploded sectional views, respectively, of an object-mounting assembly in combination with the FIG. 9 anchor baseplate assembly, in accordance with another illustrative embodiment of the invention.
Figure 11B:
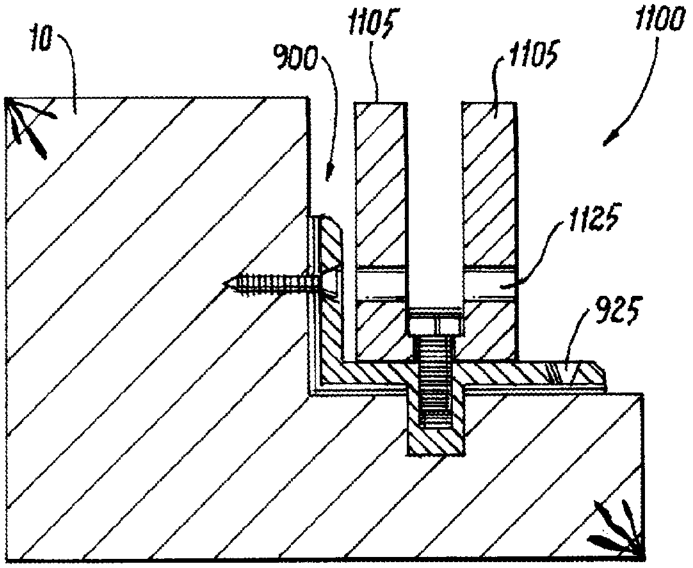

FIGS. 11A and 11B show exploded and unexploded sectional views, respectively, of a third alternative object-mounting assembly 1100 in combination with the third alternative anchor baseplate assembly 900. Here again, for clarity, no roof membranes, caulking, and washers are explicitly shown, but they may be used in real-world applications if so desired. The third alternative object-mounting assembly 1100 includes two parallel sidewalls 1105 and a floor 1110. An opening 1115 (similar to the openings 160) is defined in the floor 1110. The opening 1115 lines up with the internally-threaded bore 915 of the third alternative anchor baseplate assembly 900, allowing an object-mounting fastener 1120 to attach the third alternative object-mounting assembly 1100 to the third alternative anchor baseplate assembly 900. Smooth-walled ports 1125 in the two parallel sidewalls 1105 are meanwhile in registry with the three secondary-baseplate-portion holes 930 of the third alternative anchor baseplate assembly 900 while none of the three primary-baseplate-portion holes 925 are covered. Accordingly, even with the third object-mounting assembly 1100 attached to the third alternative anchor baseplate assembly 900, anchor-baseplate fasteners 1130 can be driven straight into the holes 925, 930 in the structure 10 using, for example, a driving tool such as a screwdriver. So arranged, the assembly in FIGS. 11A and 11B may also be formed by methods similar to either the FIRST ATTACHMENT METHOD or the SECOND ATTACHMENT METHOD.

In the embodiment described with reference to FIGS. 1-5, the object-mounting assembly 110 was attached to the anchor baseplate assemblies 105 via the object-mounting fasteners 195, which were in the form of bolts. The object-mounting fasteners 195 were fixated to the anchor baseplate assemblies 105 via threadable engagement with the internally-threaded bores 140 of the anchor baseplate assemblies 105. In alternative embodiments, however, the anchor baseplate assemblies may not have internally-threaded bores, and the object-mounting fasteners for the system may instead comprise externally-threaded studs that are fixated to the anchor baseplate assemblies and project upward therefrom towards the object-mounting assembly. The externally-threaded studs may be fixated to the anchor baseplate assemblies by, for example, welding or by screwing the externally-threaded studs into the anchor baseplate assemblies. Alternatively, an anchor baseplate assembly with an externally-threaded stud may be formed as one piece by, for example, milling or 3D printing. In this case, the externally-threaded stud is integral to the anchor baseplate assembly.

Figure 12:
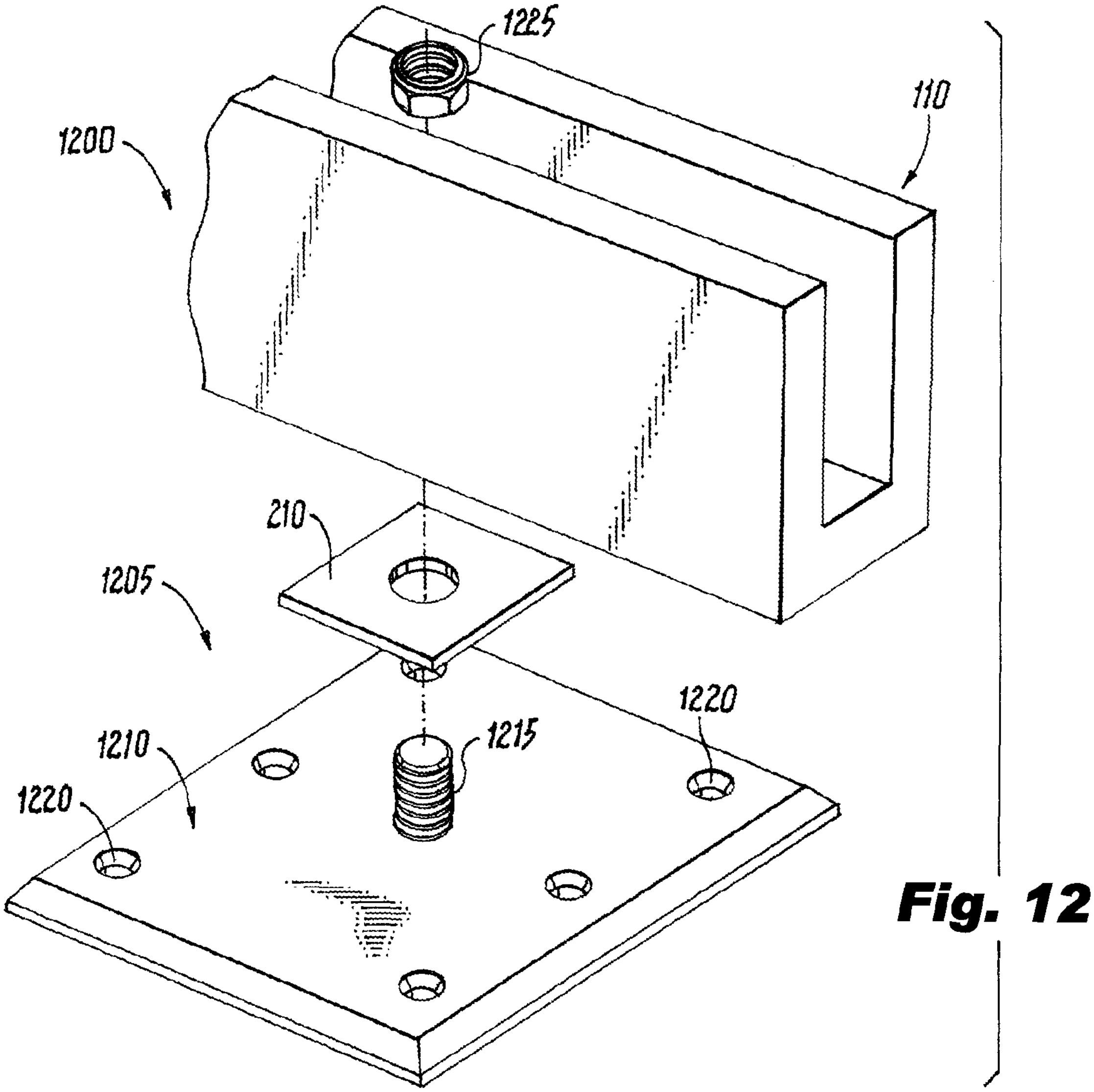
FIG. 12 shows an exploded perspective view of a portion of an accessory structure mounting system in accordance with another embodiment of the invention.

FIG. 12 shows an exploded perspective view of a portion of an accessory structure mounting system 1200 in accordance with an alternative embodiment of the invention. The accessory structure mounting system 1200 combines the object-mounting assembly 110 with a fourth alternative anchor baseplate assembly 1205. The fourth alternative anchor baseplate assembly 1205 includes a baseplate 1210 with an externally-threaded stud 1215 projecting upward from the baseplate 1210. The fourth alternative anchor baseplate assembly 1205 also includes holes 1220. A nut 1225 combines with the externally-threaded stud 1215 to attach the object-mounting assembly 110 to the fourth alternative anchor baseplate assembly 1205. Again, in this embodiment, the externally-threaded stud 1215 is acting as the object-mounting fastener for the accessory structure mounting system 1200.

Figure 13:
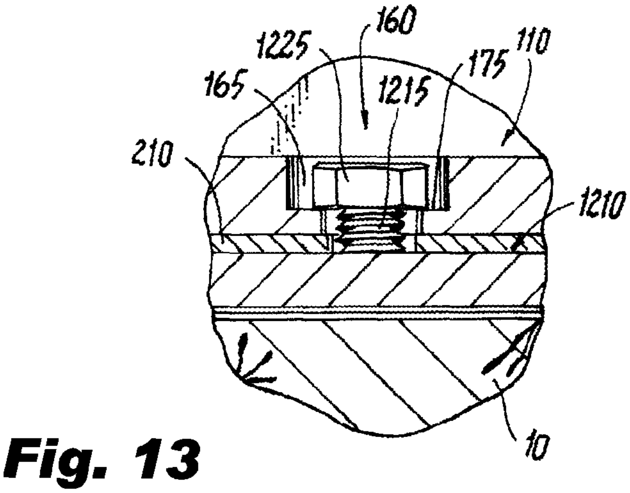
FIG. 13 shows a sectional view of a portion of the FIG. 12 accessory structure mounting system.

FIG. 13 shows a sectional view of a portion of the accessory structure mounting system 1200 with the object-mounting assembly 110 attached to the fourth alternative anchor baseplate assembly 1205. The externally-threaded stud 1215 passes through the washer 210 and is disposed within the opening 160. The nut 1225 threadably engages the externally-threaded stud 1215 and occupies the upper open portion 165 of the opening 160, pressing down on the shelf 175. The nut 1225 is thereby recessed within the floor 155 of the object-mounting assembly 110 and does not interfere with subsequent installation of the pane of glass 115.

While the above-described embodiments involve mounting a glass railing utilizing anchor baseplate assemblies and object-mounting assemblies, alternative embodiments in accordance with aspects of the invention may involve mounting very different accessory structures. These other accessory structures may include, but are not limited to, windows, posts, rails, brackets, columns, mounts, stands, and the like.

At the same time, while it is preferred to utilize elongate openings in object-mounting assemblies because of the added adjustability that they provide during mounting, circular openings may be used instead if so desired. That is, as just one example, the openings 160 in the object-mounting assembly 110 may be made circular rather than elongate.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus comprising:

an anchor baseplate assembly comprising:
 a baseplate;
 a plurality of holes passing through the baseplate;
an object-mounting assembly comprising:
 an opening passing through the object-mounting assembly;
 a smooth-walled port passing through the object-mounting assembly; and
an object-mounting fastener at least partially disposed in the opening and fixated to the anchor baseplate assembly;
wherein the object-mounting assembly is attached to the anchor baseplate assembly at least in part by the object-mounting fastener;
wherein the smooth-walled port is in registry with one of the plurality of holes, is entirely unthreaded, and has an entirely straight sidewall; wherein the anchor baseplate assembly further comprises: a post projecting from the baseplate; and an internally-threaded bore in the post.

2. The apparatus of claim 1, further comprising a structure, wherein the anchor baseplate assembly is attached to the structure with the post occupying a volume within the structure.

3. The apparatus of claim 1, wherein:
the object-mounting fastener comprises a bolt; and
the bolt threadably engages the internally-threaded bore.

4. The apparatus of claim 1, wherein the internally-threaded bore is closed at one end.

5. The apparatus of claim 1, wherein:
the post defines external threads; and
the apparatus further comprises a nut threadably engaging the external threads.

6. The apparatus of claim 1, wherein the object-mounting assembly comprises a plurality of smooth-walled ports passing through the object-mounting assembly, each of the plurality of smooth-walled ports in registry with a respective one of the plurality of holes.

7. The apparatus of claim 1, wherein the object-mounting fastener comprises an externally-threaded stud fixated to the baseplate and projecting towards the object-mounting assembly.

8. The apparatus of claim 1, wherein the baseplate comprises a primary baseplate portion attached to a secondary baseplate portion at an angle.

9. The apparatus of claim 1, wherein the opening is elongate.

10. The apparatus of claim 1, wherein the opening necks down as it passes through the object-mounting assembly so as to create a shelf that is recessed within the object-mounting assembly.

11. The apparatus of claim 1, wherein the object-mounting assembly further comprises:
a floor; and
a pair of parallel sidewalls with the floor spanning therebetween.

12. The apparatus of claim 11, wherein the opening passes through the floor.

13. The apparatus of claim 11, wherein the opening passes through at least one of the pair of parallel sidewalls.

14. The apparatus of claim 11, wherein the smooth-walled port passes through the floor.

15. The apparatus of claim 11, wherein the smooth-walled port passes through the pair of parallel sidewalls.

16. The apparatus of claim 11, further comprising a pane of glass supported by the object-mounting assembly between the pair of parallel sidewalls.

17. The apparatus of claim 1, further comprising a plurality of anchor-baseplate fasteners, each of the plurality of anchor-baseplate fasteners passing through a respective one of the plurality of holes.

18. The apparatus of claim 1, wherein:
the apparatus further comprises a second anchor baseplate assembly comprising:
a second baseplate;
a plurality of second holes passing through the second baseplate;
the object-mounting assembly further comprises:
a second opening passing through the object-mounting assembly;
a second smooth-walled port passing through the object-mounting assembly; and
the apparatus further comprises a second object-mounting fastener at least partially disposed in the second opening and fixated to the second anchor baseplate assembly;
wherein the object-mounting assembly is attached to the second anchor baseplate assembly at least in part by the second object-mounting fastener;
wherein the second smooth-walled port is in registry with one of the plurality of second holes.

19. A method for attaching an accessory structure to a main structure, the method comprising the steps of:
receiving an anchor baseplate assembly comprising:
a baseplate;
a plurality of holes passing through the baseplate;
receiving an object-mounting assembly comprising:
an opening passing through the object-mounting assembly;
a smooth-walled port passing through the object-mounting assembly;
receiving an object-mounting fastener;
receiving a plurality of anchor-baseplate fasteners;
attaching the object-mounting assembly to the anchor baseplate assembly at least in part by utilizing the object-mounting fastener with the object-mounting fastener at least partially disposed in the opening and fixated to the anchor baseplate assembly; and
passing, with the object-mounting assembly attached to the anchor baseplate assembly at least in part by the object-mounting fastener, each of the plurality of anchor-baseplate fasteners through a respective one of the plurality of holes into the main structure to secure the anchor baseplate assembly to the main structure, one of the plurality of anchor-baseplate fasteners also being passed through the smooth-walled port;
wherein the smooth-walled port is entirely unthreaded and has an entirely straight sidewall.

* * * * *